Patented Nov. 12, 1929

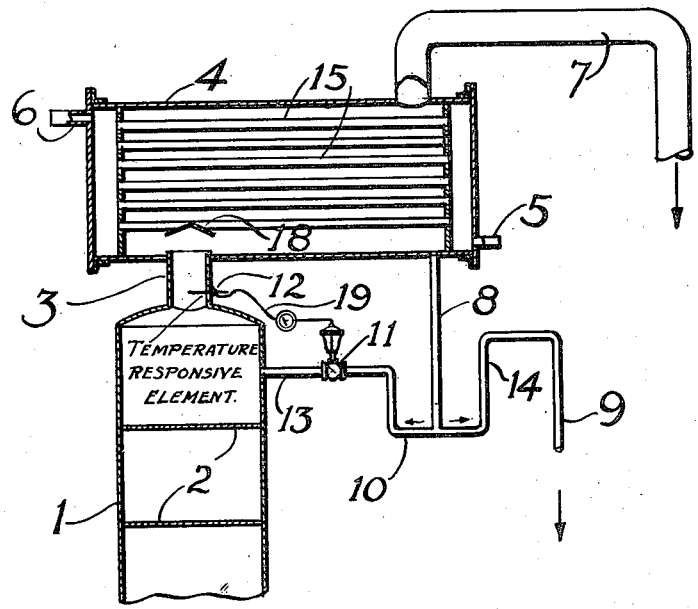
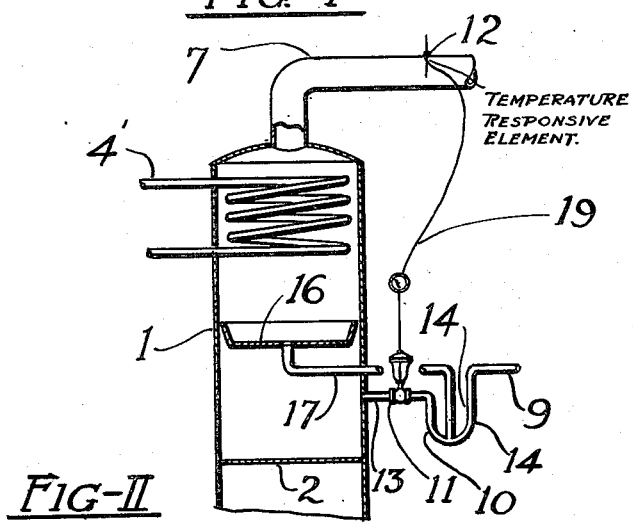

1,735,470

UNITED STATES PATENT OFFICE

HENRY M. NOEL, OF ELIZABETH, NEW JERSEY, ASSIGNOR TO STANDARD OIL DEVELOPMENT COMPANY, A CORPORATION OF DELAWARE

AUTOMATIC REGULATION OF REFLUX IN FRACTIONATING TOWERS

Application filed September 21, 1925. Serial No. 57,606.

The present invention is directed to the art of fractional distillation and rectification and particularly to a means whereby the rectification may be automatically and accurately controlled and regulated. The invention will be fully understood by reference to the following description and accompanying drawings, in which Fig. 1 shows diagrammatically in section one arrangement of parts required for practicing the invention; and Fig. 2 shows an alternative arrangement of parts.

Referring to the drawings, a bubble tower 1 or other equivalent vapor rectifying means, such as a dephlegmator, rectifying column, and the like, having plates 2 or other devices equipped with means for intimately contacting a liquid and a vapor, is positioned over a still or other vaporizing means (not shown) and receives vapors therefrom. Communicating with the tower by means of a vapor outlet 3, provided with a suitable deflecting plate 18 positioned to prevent substantial return of reflux to the tower, is a reflux or partial condenser 4 having an inlet 5 and an outlet 6 with connecting pipes or sections 15 through which there is passed a cooling liquid, preferably the stock to be fed to the still. A vapor line 7 connects the partial condenser to a final condenser (not shown). The vapor space of the partial condenser may be baffled or otherwise constructed to cause the vapors passing therethrough to follow a tortuous path while contacting with the cooled surfaces.

The partial condenser employed is preferably somewhat oversize for serving simply as a reflux condenser and ordinarily produces more reflux than is necessary for the fractionation and rectification of the vapors produced. The excess reflux, the quantity of which is determined by the amount of reflux required for temperature control of the tower, flows out through a total reflux line 8 connected with an excess reflux line 9 by a section 14. Through this line 9 all excess condensate produced in the partial condenser is withdrawn and may be flowed into a separate cooler, passed to the final condenser for overhead vapors, or flowed to any other portion of the system as desired. The total reflux line 8 is provided with a trap or liquid seal and is branched and extended as shown by a portion 10 controlled by a valve 11 and joined to a section 13 delivering to the tower preferably at a position somewhat above the topmost plate therein. The valve 11 is automatically operated, preferably by compressed air or liquid, by means of a thermostatic element 12 which is connected to the valve 11 by a line 19. Operation of the valve 11, therefore, causes a controlled but varying proportion of condensate to return to the tower through line 13 as the temperature of the vapors passing through the outlet of the tower tends respectively to rise or fall.

The condensate which is returned to the tower through line 13 as described, cools the vapors in the tower by vaporizing therein. As the temperature of the vapors in the vapor outlet from the tower rises, the valve 11 is automatically opened and a larger portion of the total reflux is diverted through lines 10 and 13 into the tower, thereby cooling the upper portion thereof and restoring normal operating conditions therein. In this manner an accurate control over the temperature of the tower and consequently a control of the quality of distillate produced is maintained. The thermostatic element 12 and the setting of the valve 11 are adjusted so that while the proper reflux ratio and optimum operating conditions are in effect, a certain amount of reflux is returned to the tower while the remainder of the reflux is being overflowed through excess reflux line 9 and conducted to the condenser. As the temperature of the vapors within the tower tends to fall, the valve 11 will tend to close, thereby restricting the amount of reflux returning to the tower and increasing the amount of reflux overflowing through excess reflux line 9. By operating in this manner the proper operating temperature may be determined and maintained in spite of considerable fluctuation in the rate of firing the still, in the rate of feeding stock through the partial condenser and to the still, and in the rate of supplying steam to the still if steam be required therein. Uniform gravity of a stream of condensate is realized by means of the automatic control on the quantity of reflux returned to the tower in the manner as shown. With the valve 11 open a flow of liquid through pipes 8, 10, and 13 is caused, due to the lesser height of the section 10 as compared with section 14.

An alternative arrangement of apparatus is illustrated in Fig. 2. As shown in this figure, a partial condenser 4' is positioned above the top plate 2 of the tower 1. Between the partial condenser 4' and the top plate 2 is a collecting pan 16 of sufficient size and so positioned as to collect the liquid condensed by the partial condenser 4'. This condensate or reflux liquid is withdrawn from the tower through pipe 17 and is used largely as reflux in the tower. The excess reflux may be flowed through line 9 to the final condenser or otherwise treated. If the temperature of the vapors in the tower inadvertently tends to become too high for the best operating conditions, the partially opened valve 11 is further opened automatically by means of the thermostatic or heat responsive element 12, or by other analogous means. A sufficient quantity of reflux is thereby returned to the tower through line 13 to restore normal operating conditions therein. If the temperature of the vapors tends to become too low within the tower, the valve 11 closes somewhat, thereby slightly diminishing the amount of reflux returning to the tower and increasing the proportion of reflux overflowing through line 9.

It is apparent that the relative positions of the various parts of the apparatus may be varied somewhat if desired. For example, the thermostatic element shown in Fig. 1 as positioned in the vapor outlet from the tower may be located in the vapor outlet from the partial condenser, or the element 12 shown in Fig. 2 may be located below pan 16. A small by-pass line may also be provided around the control valve in order that a certain amount of reflux may be constantly available and continuously supplied to the tower. The control valve 11 is preferably partly opened in normal operation and automatically closed to a definite extent as the temperature in the tower tends to fall, or is opened to a slightly greater degree as the temperature within the tower tends to rise. Furthermore, it is also within the scope of my invention to replace the partial condenser shown with a total condenser and then to return the quantity of condensate necessary for controlling the temperature of the vapors within the tower by pump means, if desired, or by gravity flow means as shown.

I claim:

1. An apparatus for rectifying vapors comprising the combination of a tower, cooling means for condensing a portion of the outgoing vapors therefrom to form a source of condensate, a reflux line from said source to the tower, and automatic means actuated by the temperature of the vapors for directly controlling the return to the tower of a controlled portion of the condensate so formed.

2. An apparatus for rectifying vapors comprising the combination of a tower, cooling means in conjunction with said tower, a reflux line for removing the condensate produced by said cooling means, a branch pipe leading from said reflux line to said tower, a valve in said branch pipe, and a heat responsive element in the vapor outlet from said tower whereby said valve is operated automatically to control the amount of condensate returned to the tower.

3. An apparatus for rectifying vapors comprising the combination of a tower, a partial condenser adapted to condense the condensible vapors from said tower, a vapor outlet beyond said partial condenser, a line anterior to said partial condenser and connected to a liquid trap, an overflow line leading from said trap, a line from said trap to the tower, a valve in said line, and means for automatically operating said valve.

HENRY M. NOEL.